Patented Aug. 20, 1946

2,405,963

UNITED STATES PATENT OFFICE 2,405,963

CO-OXIDATION REACTION

Alfred T. Larson, Wilmington, Del., assignor to E. I. du Pont de Nemours & Company, Wilmington, Del., a corporation of Delaware No Drawing. Application July 3, 1944, Serial No. 543,412

7 Claims. (Cl. 260—464)

This invention relates to the manufacture of formaldehyde cyanhydrin, and particularly to a novel vapor phase process whereby formaldehyde cyanhydrin may be obtained from ammonia and methanol.

Heretofore, formaldehyde cyanhydrin has been prepared by liquid phase reaction between formaldehyde and hydrogen cyanide. This process was satisfactory from the standpoint of yield, but the hydrogen cyanide costs were rather high, and, accordingly, an improved, lower cost process for large-scale manufacture of formaldehyde cyanhydrin was desirable.

An object of this invention is to provide an improved process for the preparation of formaldehyde cyanhydrin. Another object is to provide a vapor phase process for preparing formaldehyde cyanhydrin from relatively inexpensive starting materials. Other objects of the invention will appear hereinafter.

These and other objects of the invention are accomplished by vapor phase catalytic co-oxidation of ammonia and methanol, followed by cooling the co-oxidation products. The term co-oxidation as used in this specification implies oxidation of two or more substances in the same reaction space at the same time with an oxygen-containing gas and in the presence of a catalyst. Thus, according to the invention, methanol, ammonia and a gas containing gaseous oxygen are introduced into a reaction vessel containing a solid catalyst at a temperature in the range of 300° to 600° C. (preferably about 475° to 525° C.), and the effluent gases are cooled to a temperature below about 185° to 200° C., whereby formaldehyde cyanhydrin is produced. The cooling is thereafter continued, preferably until a temperature of about 25° C. is reached, and during this cooling, vapor phase reaction between any free formaldehyde which may be present, and hydrogen cyanide, takes place until the formaldehyde is, in most instances, substantially completely consumed.

The relative molal proportions of methanol and ammonia employed according to the invention may vary widely, but optimum results are obtained when about 0.5 to 15.0 moles of methanol are employed per mole of ammonia. When the molal ratio of methanol to ammonia initially is less than 2.0 there is danger of "runaway" reaction in which the temperature is difficult or impossible to control. One method for preventing the "runaway" reaction is to use as the source of oxygen an oxygen-containing gas which is relatively dilute in gaseous oxygen. When the molal ratio of methanol to ammonia is initially in the range between about 2.0 and about 15.0, the oxygen content of the oxygen-containing gas may be within the range of about 5% to 21% without danger of a "runaway" reaction. The oxygen-containing gas may be air, or air diluted with an inert gas, such as nitrogen. The amount of oxygen-containing gas employed should be sufficient to provide about 1.5 to 3.0 moles of gaseous oxygen per mole of ammonia initially charged.

In general, solid oxidation catalysts are employed in the practice of this invention. A preferred class of catalysts is represented by the molybdates and phosphomolybdates of iron, manganese, bismuth or cadmium. An outstanding member of this class is ferric molybdate. The space velocity, based on gaseous ammonia, is about 100 to 1,000, preferably about 200 to 500 c. c. (N. T. P.) per hour, per c. c. of the catalyst.

In the practice of the invention methanol, ammonia and the oxygen-containing gas are preferably preheated to about reaction temperature and then conducted over the catalyst. After passing over the catalyst the vapors are cooled to about room temperature whereby formaldehyde cyanhydrin, together with a certain amount of HCN and unreacted methanol, collects as a liquid condensate. The products which do not condense at room temperature may thereafter be cooled to a considerably lower temperature, and removed by condensation. Alternatively, the gases may be scrubbed with a suitable solvent, such as water, whereby any remaining HCN and methanol are removed. The resulting stripped gas may be used as a diluent in making up the oxygen-containing gas having the desired percentage of gaseous oxygen, as hereinbefore described.

The mechanism of the reaction or reactions whereby formaldehyde cyanhydrin is produced is not known with certainty, but it is believed that the primary co-oxidation products may be formaldehyde and hydrogen cyanide which, under the reaction conditions, combine in the vapor phase, yielding a product which contains formaldehyde cyanhydrin. Regardless of the theory, the end result is quite surprising in view of the fact that formaldehyde cyanhydrin at elevated temperatures is normally converted to dark-colored resinous materials of unknown composition.

The catalysts disclosed herein have the remarkable property of catalyzing both the dehydrogenation of methanol, and the oxidation of ammonia. In the presence of these catalysts decomposition of ammonia to nitrogen and hydrogen takes place to some extent, but this decomposition does not take place to any greater extent than in the synthesis of hydrogen cyanide by oxidation of ammonia in the presence of methane.

The invention is further illustrated by means of the following examples.

*Example 1.*—A mixture containing 32.2 grams of methanol, 7.4 grams of ammonia and 4.0 cubic feet of a gas containing 92.7% nitrogen (by volume) and 7.3% oxygen was passed over 32 c. c. of ferric molybdate catalyst (14 to 20 mesh) during a period of 0.5 hour at a temperature of 510° C. (maximum catalyst temperature). The resultant gases were passed through a condenser at 25° C., and the uncondensed vapors were conducted through cold traps at −80° C. Distillation of the combined condensates gave HCN and formaldehyde cyanhydrin (conversions, 55% and 18% respectively, based on ammonia initially charged).

*Example 2.*—A mixture containing 11.6 grams of ammonia, 87.5 grams of methanol and 3.6 cubic feet of a gas containing 92.5% nitrogen and 7.5% oxygen was passed over 22 c. c. of ferric molybdate catalyst (14 to 20 mesh) during a period of 0.5 hour at a temperature of 484° C. (maximum catalyst temperature). The effluent gases were passed through a condenser at 25° C., and the uncondensed portion was conducted through cool traps at −80° C. Distillation of the combined condensates gave HCN and formaldehyde cyanhydrin (conversions 35% and 12% respectively, based on ammonia charged).

These examples are intended to be illustrative only since many different modifications of the invention will occur to persons skilled in the art. Accordingly, we do not limit ourselves except as set forth in the following claims.

I claim:

1. A process for the synthesis of formaldehyde cyanhydrin which comprises co-oxidation of ammonia and methanol in the vapor phase in the presence of a ferric molybdate catalyst at a temperature within the range of 300° to 600° C., whereby a mixture of gaseous products is produced, cooling the said mixture at a temperature in the range of 25° to 200° C. whereby a product containing formaldehyde cyanhydrin is produced.

2. A process for the synthesis of formaldehyde cyanhydrin which comprises co-oxidation of a mixture containing 2.0 to 15.0 mols of methanol per mol of ammonia, with sufficient oxygen-containing gas of 5% to 21% oxygen content to provide 1.5 to 3.0 mols of oxygen per mol of ammonia in the said methanol-ammonia mixture, at a temperature of about 475° to 525° C. and at an ammonia space velocity of about 100 to 1000 in the presence of ferric molybdate catalyst, and cooling the resultant mixture to a temperature within the range of 25° to 200° C., whereby condensation of a mixture containing formaldehyde cyanhydrin is effected.

3. A process for the synthesis of formaldehyde cyanhydrin which comprises co-oxidation of ammonia and methanol in the vapor phase in the presence of a ferric molybdate catalyst at a temperature within the range of 300° to 600° C. and cooling the resultant co-oxidation mixture whereby a product containing formaldehyde cyanhydrin is produced.

4. A process for the synthesis of formaldehyde cyanhydrin which comprises co-oxidation of a mixture containing 2.0 to 15.0 moles of methanol per mole of ammonia with a gas containing 5% to about 21% gaseous oxygen at a temperature within the range of 300° to 600° C. in the presence of a ferric molybdate catalyst, and cooling the resultant mixture to a temperature within the range of 25° to 200° C., whereby condensation of a mixture containing formaldehyde cyanhydrin is effected.

5. A process for the synthesis of formaldehyde cyanhydrin which comprises co-oxidation of a mixture containing 2.0 to 15.0 moles of methanol per mole of ammonia by means of air diluted with an inert gas at a temperature within the range of 300° to 600° C. in the presence of a ferric molybdate catalyst, and cooling the resultant mixture to a temperature within the range of 25° to 200° C., whereby condensation of a mixture containing formaldehyde cyanhydrin is effected.

6. A process for the synthesis of formaldehyde cyanhydrin which comprises co-oxidation of a mixture containing 2.0 to 15.0 moles of methanol per mole of ammonia, with sufficient oxygen-containing gas of 5% to 21% oxygen content to provide 1.5 to 3.0 moles of oxygen per mole of ammonia in the said methanol-ammonia mixture, at a temperature within the range of 300° to 600° C., in the presence of a ferric molybdate catalyst, and cooling the resultant mixture to a temperature below 200° C., whereby condensation of a mixture containing formaldehyde cyanhydrin is effected.

7. A process for the synthesis of formaldehyde cyanhydrin which comprises co-oxidation of a mixture containing 2.0 to 15.0 moles of methanol per mole of ammonia with sufficient oxygen-containing gas of 5% to 21% oxygen content to provide 1.5 to 3.0 moles of oxygen per mole of ammonia in the said methanol-ammonia mixture at a temperature of about 475° to 525° C. and at an ammonia space velocity of about 100 to 1000, in the presence of a ferric molybdate catalyst, and cooling the resultant mixture to a temperature within the range of 25° to 200° C., whereby condensation of a mixture containing formaldehyde cyanhydrin is effected.

ALFRED T. LARSON.